Figure 1:
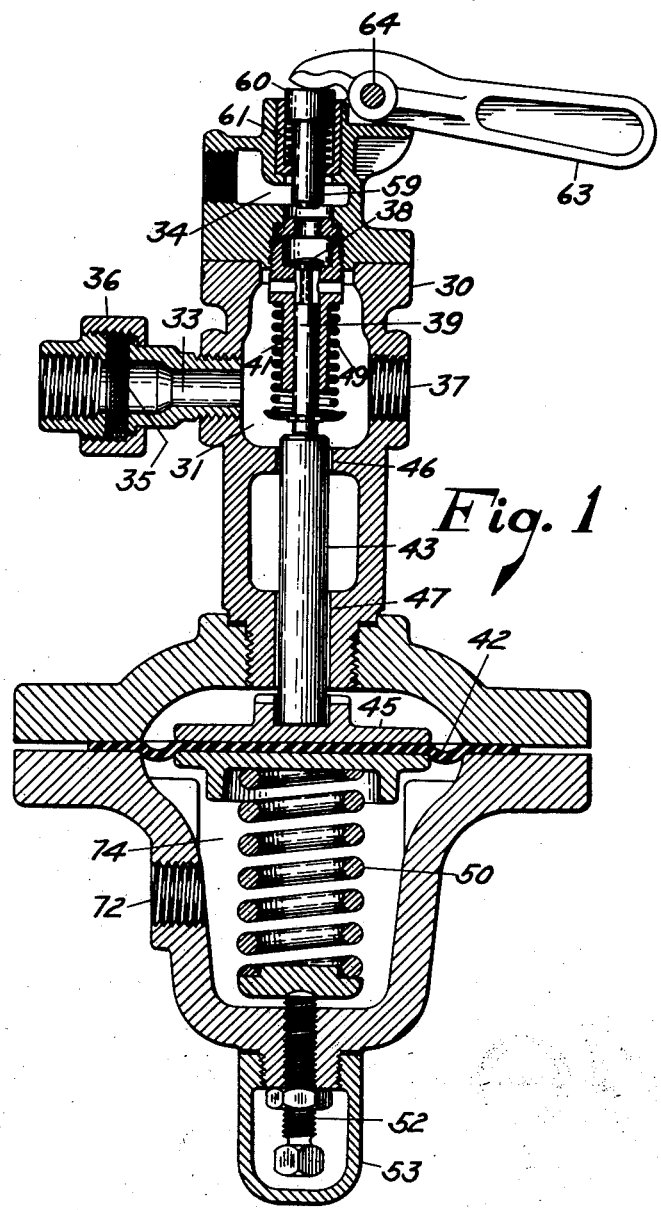

Nov. 1, 1932.  C. M. TERRY  1,885,565
FLUID PRESSURE ACTUATED CONTROL MECHANISM
Filed April 21, 1930   2 Sheets-Sheet 1

WITNESS
A. G. Blodgett

INVENTOR
CHARLES M. TERRY
BY
Clayton Jenks
ATTORNEY

Nov. 1, 1932.　　　　　C. M. TERRY　　　　　1,885,565
FLUID PRESSURE ACTUATED CONTROL MECHANISM
Filed April 21, 1930　　　2 Sheets-Sheet 2

WITNESS
A. G. Blodgett

INVENTOR
CHARLES M. TERRY
BY
Clayton R. Jenks
ATTORNEY

Patented Nov. 1, 1932

1,885,565

UNITED STATES PATENT OFFICE

CHARLES M. TERRY, OF DECATUR, ILLINOIS, ASSIGNOR TO A. W. CASH COMPANY, OF DECATUR, ILLINOIS, A CORPORATION OF DELAWARE

FLUID PRESSURE ACTUATED CONTROL MECHANISM

Application filed April 21, 1930. Serial No. 445,978.

This invention relates to fluid pressure actuated control mechanisms, and more particularly to a mechanism of this general type which will serve to actuate a control device in response to variations in the pressure or rate of flow of a fluid.

It is frequently desirable to utilize an automatic mechanism to actuate a control device for the purpose of putting various types of auxiliary apparatus into operation upon failure of a main apparatus to maintain a desired condition. For examle, it often happens that two pumps are connected to discharge fluid under pressure into a common system, only one of the pumps being used under normal conditions and the other being maintained as an auxiliary for safety purposes. In such an installation it is customary to provide means for starting the auxiliary pump automatically in the event the first pump should fail to provide the desired fluid pressure or rate of flow. Of the prior constructions which have been utilized for this and similar purposes, some have been complicated and expensive to manufacture, and others have been delicate and liable to become inoperative as a result of wear or lack of needed attention.

It is accordingly the main object of my invention to provide a mechanism which will serve to actuate a control device automatically in response to variations in the pressure or rate of flow of a fluid, and particularly to provide such a mechanism which will be simple and inexpensive to manufacture and install, and is of such a rugged and fool-proof construction that it will unfailingly perform the functions for which it is intended throughout a long life of usefulness.

It is a further object of my invention to provide a mechanism which will automatically place an auxiliary power driven pump into operation upon failure of a main pump to deliver the desired volume or pressure of fluid, and which will maintain the auxiliary pump in continuous and uniform operation.

It is a further object of my invention to provide a mechanism which will permit the auxiliary pump to be manually stopped and the entire mechanism restored to its original condition after the main pump has been again placed in operation.

With these and other objects in view, as will be apparent to those skilled in the art, my invention resides in the combination of parts set forth in the specification and covered by the claims appended hereto.

Figure 2:
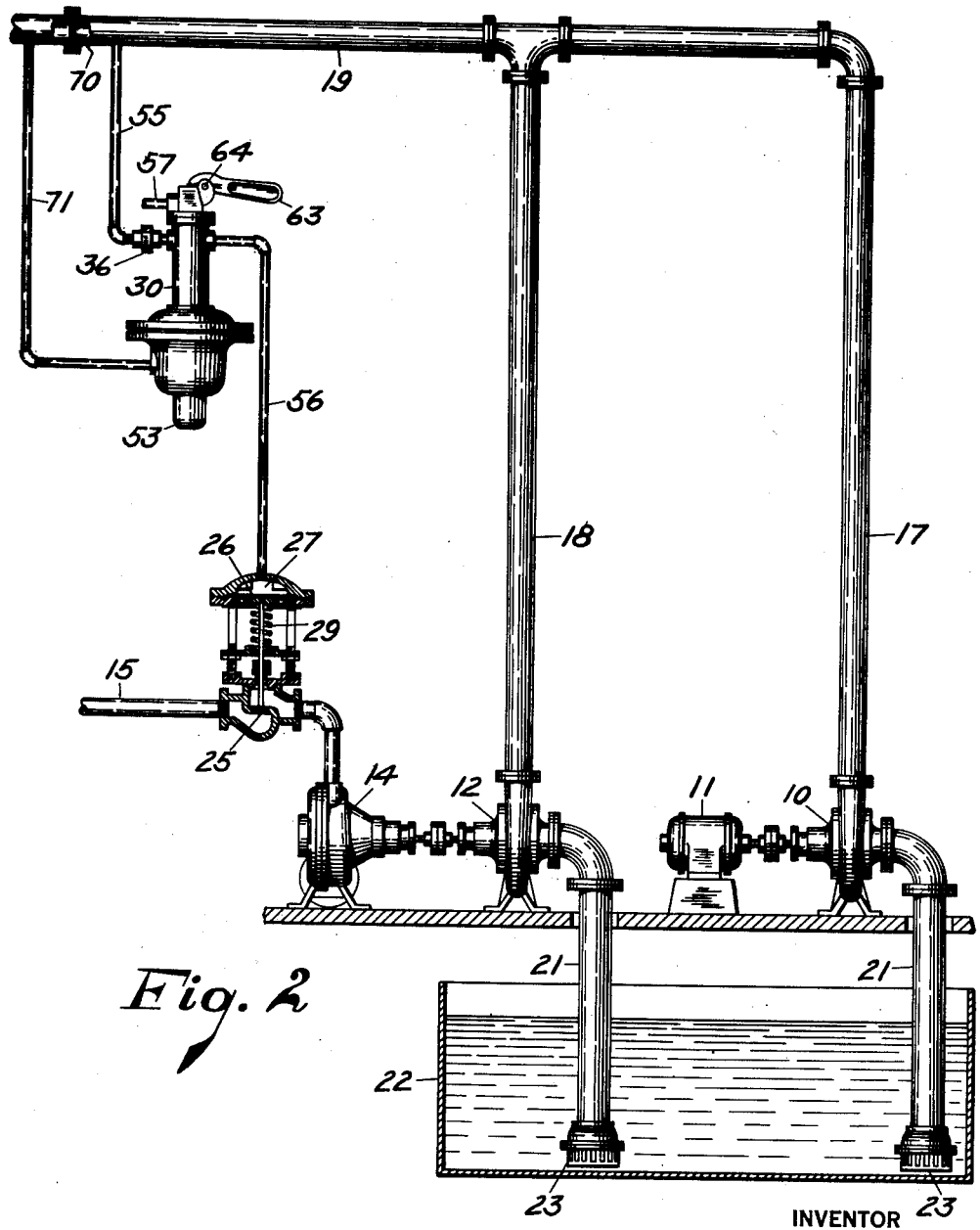

Referring to the drawings illustrating one embodiment of my invention, and in which like reference numerals indicate like parts:

Fig. 1 is a vertical section through the center of a pressure responsive valve mechanism; and Fig. 2 is an elevation illustrating the valve mechanism connected to fluid delivery apparatus comprising two pumps arranged to deliver fluid to a common pipe, certain parts being shown in section for clearness of illustration.

In accordance with my invention, I have provided a fluid pressure actuated control mechanism which controls the operation of secondary control devices of various types and particularly such devices as are used to control the operation of apparatus arranged to produce flow of fluid in a conduit. My invention further applies to a fluid pressure system in which a continuous flow of fluid is maintained in a conduit by means of pressure actuated regulating devices. As illustrated in Figure 2 of the drawings two pumps may be employed to cause water to flow through a conduit, one pump being held as an auxiliary in case of failure of the primary pump. In order that the auxiliary pump may be brought into operation in case the flow in the conduit falls below a predetermined value, I have provided a control mechanism comprising a primary device controlled by the fluid flow in the conduit, which in turn transmits a controlling pressure to a secondary control device which directly controls the operation of this auxiliary pump. This mechanism is preferably so arranged that once the auxiliary pump has been brought into operation it cannot be stopped automatically by the restoration of normal flow in the conduit but it must be stopped by a manual control device.

This mechanism preferably comprises primary and secondary control devices, the latter being connected directly to the driving motor for the pump or to any other mechanism the operation of which is to be controlled and the primary device is connected to be affected by pressure conditions in the fluid conduit. The primary apparatus is so arranged that it transmits a definite pressure to the secondary apparatus and maintains it in an inoperative condition just so long as a predetermined pressure or a pressure differential is maintained in the conduit, but once this pressure or pressure differential falls below a predetermined amount, the primary apparatus serves to irreversibly release the pressure in the secondary apparatus and cause it to function. Thereafter the secondary apparatus may be brought to its initial condition only by a manual operation.

The specific type of primary regulating apparatus illustrated in the drawings comprises a chamber connected to receive fluid from the conduit and the flow of fluid from the chamber is regulated by means of a valve in an outlet opening, the position of the valve being determined by the pressure conditions within the conduit. This pressure within the chamber is transmitted to the secondary apparatus to maintain it in its inoperative condition; but once this maintaining pressure falls below a predetermined amount then the valve in the primary device opens and releases the pressure to such an extent that the control apparatus acts without delay to start the auxiliary pump in operation. By providing a restriction in the connection between the conduit and the primary apparatus which prevents any large amount of water flowing therethrough, I provide a condition within this primary apparatus which makes it impossible for any building up of pressure in the conduit to cause closure of the valve in the primary apparatus and a consequent operation of the secondary control device.

Referring now to the drawings which illustrate this apparatus in detail, it will be seen that the construction illustrated comprises a centrifugal pump 10 driven by a direct connected electric motor 11, and a second similar pump 12 driven by a direct connected steam turbine 14 to which steam may be supplied through a steam pipe 15. Pumps 10 and 12 are connected to discharge pipes 17 and 18 respectively which lead to a common main conduit or pipe 19. Each pump has a suction pipe 21 connected thereto leading from a liquid reservoir 22. A foot valve 23 of well known construction is located at the lower end of each suction pipe and serves to maintain its corresponding pump primed and prevent the by-passing of the flow through an idle pump.

In normal operation of the apparatus pump 10 serves to maintain the desired pressure or rate of flow in main conduit 19, and pump 12 is prevented from running by a suitable control device, such as a valve 25 in the steam pipe 15 leading to the turbine. This valve is connected to a flexible diaphragm 26 which is subjected to fluid pressure in a diaphragm chamber 27. This fluid pressure tends to hold the valve closed, and it is opposed by a compression spring 29 and by the steam pressure beneath the valve. It will thus be seen that valve 25 will remain closed as long as the pressure in diaphragm chamber 27 exceeds a predetermined value, and it will open and start the turbine driven pump 12 whenever this pressure falls below the predetermined value. As one important feature of my invention I provide an automatic valve mechanism which may be used in connection with various other apparatus, but which is particularly adapted to vary the pressure in diaphragm chamber 27 in accordance with conditions of pressure or flow in the main conduit 19 and thus maintain the desired conditions in the event of failure of pump 10 to function properly.

Referring particularly to Fig. 1, my improved control mechanism is shown as comprising a casing 30 shaped to form a chamber 31 having an inlet passage 33 and an outlet passage 34. For reasons which will hereinafter appear it is desirable to restrict the inlet passage, thus limiting the rate of flow into the chamber 31, and this is preferably accomplished by providing a pair of spaced orifice plates 35. By utilizing two plates it is possible to employ larger orifices than in case of a single plate, thereby reducing the danger of clogging. The plates 35 are mounted in a screwed union 36, which permits their removal for inspection or cleaning without dismantling the connection pipe. A screw threaded opening 37 is preferably provided in a wall of the chamber through which the fluid pressure may be transmitted to actuate the valve 25.

A valve 38 is mounted in the outlet passage 34 to control the flow therethrough. This valve is shown as of the poppet type having a downwardly extending stem 39 slidable vertically in a stationary guide sleeve 41. The valve is arranged to open with an upward movement. The movements of the valve are controlled by a pressure responsive device, such as a flexible diaphragm 42 supported beneath the valve by the casing. The connection between the diaphragm and the valve comprises a vertical cylindrical rod 43 supported at its lower end on a pressure plate 45 in contact with the diaphragm. This rod is slidable through guide openings 46 and 47 in the casing which are slightly larger in diameter than the rod so that the diaphragm is subjected to the fluid pressure in the chamber 31. The upper end of the rod 43 is located directly beneath the lower end of the valve stem 39, and under certain circumstances contacts therewith. A compression spring 49 surrounding the sleeve 41 urges the valve toward closed position and this spring is of sufficient strength to hold the valve closed against the normal pressure in chamber 31 unless such closure is prevented by rod 43. A compression spring 50 beneath the diaphragm opposes the fluid pressure in the chamber 31 and this spring is made strong enough to overcome spring 49 and open valve 38 whenever the fluid pressure in the chamber falls below a predetermined value. The spring 50 thus serves to bias the valve toward open position, and the tendency of the pressure in the chamber is to close the valve against its bias. A screw 52 supports the lower end of spring 50 and permits an adjustment of its force. Leakage is prevented by a cap 53 threaded to the casing and enclosing the screw.

It will be seen that the connections between the diaphragm 42 and valve 38 are such that force may be transmitted to the valve only in a direction to cause opening movement thereof. Rod 43 is arranged to transmit force by compression but not by tension. Hence a large increase in pressure in chamber 31 will merely cause downward movement of diaphragm 42 and rod 43, and the rod will move out of contact with the valve stem 39. Valve 38 cannot therefore be held against its seat with a force greater than that caused by spring 49. Hence in case the pressure in chamber 31 should greatly exceed the normal pressure, it will open valve 38 and compress spring 49. This serves as a safety device to protect the diaphragm against rupture.

The valve mechanism as so far described may be used to start the turbine 14 whenever the pressure in pipe 19 falls below a predetermined point from any cause, such as failure of electric supply to motor 11. This result may be obtained by connecting the main pipe 19 to inlet 33 by means of a pipe 55, and connecting opening 37 to diaphragm chamber 27 by means of a pipe 56. I preferably provide a pipe 57 leading from outlet 34 to a suitable drain (not shown). Assume that with this arrangement pump 10 is running and maintaining the desired pressure in pipe 19, and valve 38 is closed. The full pressure in pipe 19 will then be effective in chambers 31 and 27, and valve 25 will be held closed, preventing operation of the turbine 14. If now pump 10 should fail, the pressure in pipe 19 and chambers 31 and 27 will decrease. Spring 50 will now open valve 38, thus relieving the pressure in chambers 31 and 27, and causing valve 25 to open. This will immediately start the turbine 14 and pump 12, restoring the desired pressure in pipe 19. Rapid inrush of fluid into chamber 31 with valve 38 open is prevented by orifice plates 35, which restrict the flow to an amount such that the wastage is negligible, and which prevent the building up of any appreciable pressure in chamber 31 so long as valve 38 is open. This leakage through the orifices flows through outlet 34 and pipe 57 to a drain.

Means is preferably provided for shutting down the turbine 14 after pump 10 has been again placed in operation. The preferred construction for accomplishing this purpose comprises a valve 59 located in the outlet passage 34 in series with valve 38, and so arranged that either valve may close the passage independently of the other. Valve 59 is slidable vertically in the casing and provided with an enlarged head 60 beneath which a compression spring 61 is located. The spring serves to bias the valve toward open position. The valve is preferably operable manually, and for this purpose I have shown a hand lever 63 pivotally mounted on a horizontal pin 64 and so arranged that one end may contact with the head 60 of the valve. The valve may be closed by lifting the hand lever and will be immediately opened by the spring 61 when the lever is released. If pump 10 is running and it is desired to stop pump 12, the operator merely lifts hand lever 63, closing valve 59. This prevents the fluid which is flowing through the orifice plates 35 from passing through the outlet 34. Hence the pressure in chamber 31 will at once increase until it equals that in pipe 19. The increased pressure will close valves 38 and 25, stopping turbine 14. After valve 38 is closed flow through the outlet is prevented, and valve 59 may be opened without affecting the pressure in chamber 31. If, however, pump 10 is not maintaining the desired pressure in pipe 19, the opening of valve 59 will release the pressure in chamber 31, and pump 12 will continue to operate.

In many cases it may be desirable to so arrange the valve mechanism that it will respond to changes in flow as indicated by a differential between two pressures. In order to obtain such a differential pressure, I preferably provide a restriction in the main pipe 19 by a suitable means, such as an orifice plate 70, the arrangement being such that the pressure drop across the orifice is a function of the rate of flow. The pipe 55 is connected to the main pipe at a point anterior to the orifice, and a second pipe 71 is connected to the main pipe at a point posterior to the orifice. Pipe 71 is connected to an opening 72 in the wall of a chamber 74 beneath the diaphragm 42. With this arrangement diaphragm 42 is under normal conditions subjected to the differential pressure caused by the presence of orifice plate 70 in the main pipe, and whenever pump 10 fails to maintain a predetermined pressure differential by forcing liquid through pipe 19 at a predetermind rate, valve 38 will open, relieving the pressure in chamber 31 and opening valve 25 to start the turbine. After pump 10 is again in operation, the turbine pump can be shut down by holding up hand lever 63 until the pressure in chamber 31 has been restored to normal.

The construction is simple and inexpensive to manufacture and install, and it is entirely dependable in operation. Since there are no stuffing boxes to cause friction, the diaphragm 42 will move in response to the slightest pressure change. There is nothing which by getting out of order can detract from the safety features of the mechanism. If the orifices in plates 35 should clog with foreign material, this will merely prevent the shutting down of the turbine by means of hand lever 63. It cannot prevent the starting of the turbine in case of failure of pump 10. If diaphragm 42 should rupture, valves 38 and 25 will open, and the turbine will start.

It will, therefore, be seen that I have provided a fluid circulating system in which fluid is caused to flow continuously by apparatus which is regulated in accordance with conditions within the system. Also I have provided a regulating mechanism which is of general utility but which is illustrated in the drawings as applied to start up the operation of an auxiliary pump in case of the failure of the first, in order to maintain the flow of fluid in a conduit. This construction is so made that once the auxiliary pump has been started it cannot be stopped or its speed decreased automatically by any variation of conditions in the conduit. This prevents any hunting in the operation of the auxiliary pump and insures a continuous and substantially uniform flow of fluid. It will be understood that the regulating mechanism is of general utility and is applicable to use in various fields, such as for controlling the operation of various types of motors. The primary regulating mechanism may be marketed by itself for various purposes either for transmitting predetermined pressure conditions to any other type of apparatus or for itself actuating various control devices. It will be understood further that the primary and secondary control devices need not be separate parts connected by piping but that they may be built as a single unitary apparatus which is of special utility in fields where the operation of a prime mover is to be regulated.

Having thus described my invention, what I claim as new and desire to secure by Letters Patent is:

1. A fluid pressure actuated control mechanism comprising walls forming a chamber having an inlet for fluid, an opening for transmitting fluid pressure to a secondary apparatus, and a fluid outlet for releasing said pressure, a valve controlling the outlet flow, and a pressure responsive device which is subjected to the pressure within the chamber and so arranged that a decrease in said pressure tends to open the valve and release the pressure transmitted to the secondary apparatus.

2. A fluid pressure actuated control mechanism comprising walls forming a chamber having an inlet for fluid, an opening for transmitting fluid pressure to a secondary apparatus, and a fluid outlet for releasing said pressure, a valve controlling the outlet flow, means to bias the valve to an open position, and a device subjected to the pressure within the chamber and so arranged that said pressure tends to hold the valve closed against its bias and thus maintain the pressure transmitted to the secondary apparatus.

3. A fluid pressure actuated control mechanism comprising walls shaped to form a chamber having an inlet passage for fluid and an outlet passage, said chamber having an opening in a wall thereof through which the fluid pressure in the chamber may be transmitted to a control device, a valve mounted in the outlet passage to control the flow therethrough, a pressure responsive device which is subjected to the pressure in the chamber and so connected to the valve that said pressure tends to close the valve, and means to restrict the flow through the inlet passage and prevent the building up of pressure in the chamber so long as the outlet passage is open.

4. A fluid pressure actuated control mechanism comprising walls shaped to form a chamber having an inlet passage for fluid and an outlet passage, said chamber having an opening in a wall thereof through which the fluid pressure in the chamber may be transmitted to a control device, a valve mounted in the outlet passage to control the flow therethrough and biased to open position, a pressure responsive diaphragm which is subjected to the pressure in the chamber and so connected to the valve that said pressure tends to close the valve against its bias, and an orifice plate mounted in the inlet passage to restrict the flow therethrough and prevent the building up of pressure in the chamber so long as the outlet passage is open.

5. A fluid pressure actuated control mechanism comprising walls shaped to form a chamber having an inlet for fluid, a connection which transmits fluid pressure to a secondary apparatus and an outlet passage, two valves arranged in series in the outlet passage and so constructed that either valve may close the passage independently of the other, and a pressure responsive device which is subjected to the fluid pressure in the chamber and so arranged that said fluid pressure tends to hold one of the valves closed and maintain the pressure transmitted to said apparatus.

6. A fluid pressure actuated control mechanism comprising walls shaped to form a chamber having an inlet for fluid, a connection which transmits fluid pressure to a secondary apparatus and an outlet passage, two valves arranged in series in the outlet passage and so constructed that either valve may close the passage independently of the other, a pressure responsive device which is subjected to the fluid pressure in the chamber and so arranged that said fluid pressure tends to hold one of the valves closed and maintain the pressure transmitted to said apparatus, and manually operable means for closing the other valve.

7. A fluid pressure actuated control mechanism comprising walls shaped to form a chamber having an inlet for fluid and an outlet passage, two valves arranged in series in the outlet passage and each biased to open position, manually operable means to close one of said valves, and a pressure responsive device connected to the other of said valves, said device being subjected to the fluid pressure in the chamber and so arranged that said fluid pressure tends to close the valve.

8. A fluid pressure actuated control mechanism comprising walls shaped to form a chamber having an inlet passage for fluid and an outlet passage, said chamber having an opening in a wall thereof through which the fluid pressure in the chamber may be transmitted to a control device, an orifice plate mounted in the inlet passage to restrict the rate of fluid flow in the chamber, two valves mounted in series in the outlet passage and each biased toward open position, a flexible diaphragm subjected to the fluid pressure in the chamber, connections between the diaphragm and one of said valves which are so arranged that the pressure in the chamber tends to close the valve against its bias, and manually operable means for closing the other valve against its bias.

9. A fluid pressure actuated control mechanism comprising walls shaped to form a chamber having an inlet passage for fluid and an outlet passage, said chamber having an opening in a wall thereof through which the fluid pressure in the chamber may be transmitted to actuate a control device, an orifice plate mounted in the inlet passage to restrict the rate of flow into the chamber, a valve mounted in the outlet passage, a flexible diaphragm subjected to the fluid pressure in the chamber, connections between the diaphragm and the valve, a compression spring arranged to urge the diaphragm in opposition to the pressure in the chamber and at the same time bias the valve toward open position, a second valve in the outlet passage in series with the first valve, means to bias the second valve toward open position, and manually operable means to close the second valve against its bias.

10. A fluid pressure actuated control mechanism comprising walls shaped to form a chamber having an inlet passage for fluid and an outlet passage, said chamber having an opening in a wall thereof through which the fluid pressure in the chamber may be transmitted to actuate a control device, an orifice plate mounted in the inlet passage to restrict the rate of flow into the chamber, a valve mounted in the outlet passage, a spring urging the valve toward closed position, a flexible diaphragm subjected to the fluid pressure in the chamber, connections between the diaphragm and the valve which are so arranged that force may be transmitted therethrough only in a direction to cause opening movement of the valve, a compression spring arranged to urge the diaphragm in opposition to the pressure in the chamber, said compression spring being of greater strength than the first spring so that it serves to bias the valve toward open position, a second valve in the outlet passage in series with the first valve, means to bias the second valve toward open position, and manually operable means to close the second valve against its bias.

11. A fluid pressure actuated control mechanism comprising a casing shaped to form a chamber having an inlet passage for fluid and an outlet passage, said chamber having an opening in a wall thereof through which the fluid pressure in the chamber may be transmitted to actuate a control device, an orifice plate mounted in the inlet passage to restrict the rate of flow into the chamber, a valve mounted in the outlet passage, a compression spring urging the valve toward closed position, a flexible diaphragm subjected to the fluid pressure in the chamber, connections between the diaphragm and the valve comprising a rod arranged to transmit force by compression to cause opening movement of the valve but ineffective to transmit force by tension, a second compression spring arranged to urge the diaphragm in opposition to the pressure in the chamber, said second spring being of greater strength than the first spring so that it serves to bias the valve toward open position, a second valve in the outlet passage in series with the first valve, a spring serving to bias the second valve toward open position, and manually operable means to close the second valve against its bias and effective to hold it closed only while force is applied thereto manually.

12. A fluid pressure mechanism for actuating a device which controls the fluid flow in a conduit comprising walls forming a chamber having an inlet adapted to receive fluid flowing from the conduit, an opening adapted to transmit pressure to said device, and an outlet for fluid flow, a valve controlling the flow through the outlet, and means including a fluid pressure device connected to actuate the valve which may be subjected on opposite sides to different pressures within the conduit, one of which represents the pressure within the chamber, said parts operating to open the valve when the effective fluid pressure on the device is less than a predetermined amount.

13. A fluid pressure mechanism for actuating a device which controls the fluid flow in a conduit comprising walls forming a chamber having an inlet adapted to receive fluid flowing from the conduit, an opening adapted to transmit pressure to said device, and an outlet for fluid flow, a valve controlling the flow through the outlet, and means including a pressure responsive device subjected on one side to the pressure within the chamber and on the opposite side to an opposing pressure tending to hold the pressure responsive device immovable, said pressure responsive device being connected to open the valve when said opposing pressure is greater than the chamber pressure and thereby release the chamber pressure.

Signed at Decatur, Illinois, this 14th day of April, 1930.

CHARLES M. TERRY.